(12) United States Patent
Pessolano

(10) Patent No.: US 7,472,257 B2
(45) Date of Patent: Dec. 30, 2008

(54) REROUTING VLIW INSTRUCTIONS TO ACCOMMODATE EXECUTION UNITS DEACTIVATED UPON DETECTION BY DISPATCH UNITS OF DEDICATED INSTRUCTION ALERTING MULTIPLE SUCCESSIVE REMOVED NOPS

(75) Inventor: Francesco Pessolano, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/496,537

(22) PCT Filed: Nov. 20, 2002

(86) PCT No.: PCT/IB02/04891

§ 371 (c)(1),
(2), (4) Date: May 24, 2004

(87) PCT Pub. No.: WO03/046712

PCT Pub. Date: Jun. 5, 2003

(65) Prior Publication Data

US 2004/0268091 A1    Dec. 30, 2004

(30) Foreign Application Priority Data

Nov. 26, 2001    (EP) .................................. 01204543

(51) Int. Cl.
*G06F 9/38* (2006.01)
(52) U.S. Cl. ........................................ 712/215; 712/24
(58) Field of Classification Search ........................ None
See application file for complete search history.

(56) References Cited

U.S. PATENT DOCUMENTS

| | | | | |
|---|---|---|---|---|
| 5,951,689 A * | 9/1999 | Evoy et al. | ................... | 713/322 |
| 6,092,175 A | 7/2000 | Levy et al. | ..................... | 712/23 |
| 6,105,127 A * | 8/2000 | Kimura et al. | .............. | 712/215 |
| 6,167,503 A | 12/2000 | Jouppi | .......................... | 712/23 |
| 6,219,796 B1 | 4/2001 | Bartley | ........................ | 713/320 |
| 6,418,527 B1 * | 7/2002 | Rozenshein et al. | ......... | 712/208 |
| 6,826,704 B1 * | 11/2004 | Pickett | ........................ | 713/320 |
| 6,892,293 B2 * | 5/2005 | Sachs et al. | .................. | 712/215 |
| 2002/0188828 A1 * | 12/2002 | Sugimoto | .................... | 712/215 |

* cited by examiner

*Primary Examiner*—Kenneth S Kim

(57) ABSTRACT

Processor (100) has a plurality of registers (120) for storing instructions for execution by the plurality of execution units (160). The plurality of registers (120) are coupled to the plurality of execution units (160) via distribution means (140). Distribution means (140) have a plurality of dispatch units (144) coupled to the plurality of execution units (160) and a reroutable network, e.g. a data communication bus (142), coupling the plurality of execution units (120) to the plurality of dispatch units (144). The data communication bus (142) is controlled by control unit (148). Dispatch units (144) are arranged to detect dedicated instructions in the instruction flow, which signal the beginning of an inactive period of an execution unit (160a, 160b, 160c, 160d) in the plurality of execution units (160). Subsequently, control unit (148) is notified, and the instruction flow from the plurality of registers (120) to the plurality of dispatch units (140) is rerouted as a result of the detection of the dedicated instruction.

11 Claims, 5 Drawing Sheets

REROUTING VLIW INSTRUCTIONS TO ACCOMMODATE EXECUTION UNITS DEACTIVATED UPON DETECTION BY DISPATCH UNITS OF DEDICATED INSTRUCTION ALERTING MULTIPLE SUCCESSIVE REMOVED NOPS

The present invention relates to a processor that is configurable by a dedicated instruction.

The present invention also relates to an instruction set comprising such an instruction.

The present invention also relates to a method of distributing instruction bundles from a storage device to plurality of execution units of such a configurable processor.

The present invention also relates to a method of compiling a plurality of instruction bundles comprising such a dedicated instruction.

U.S. Pat. No. 6,219,796 shows a processor that is configurable by a dedicated instruction.

The ongoing demand for an increase in high performance computing has led to the introduction of several solutions in which some form of concurrent processing, e.g. parallelism has been introduced into the processor architecture. A widely used concept to achieve high performance is the introduction of instruction level parallelism, in which a number of processing units are present in the processor architecture for executing a number of instructions more or less at the same time. Two main concepts have been adopted: the multithreading concept, in which several threads of a program are accessible by the processing units, and the very large instruction word (VLIW) concept, in which bundles of instructions corresponding with the functionality of the execution units are present in the instruction set.

A problem associated with the aforementioned concepts is that the increase of parallelism leads to several complications, like the increase of power consumption caused by the larger number of execution units being active at the same time and the related increase of simultaneous data traffic.

The VLIW processor of U.S. Pat. No. 6,219,796 has processing units that have been made responsive to a dedicated instruction, e.g. a SLEEP or REST instruction, which at least partially powers down the associated execution unit. The execution units are made active again either by another dedicated instruction, e.g. a WAKE instruction or a second SLEEP/REST instruction operating acting as a toggle, or by the receipt of an active, e.g. non-SLEEP/REST instruction. Consequently, the active configuration of the processor can be altered by dedicated instructions present in the instruction flow of VLIWs, resulting in a reduction of the power consumption by the active processor. The dedicated instructions are inserted into a VLIW by the compiler; this is realized by first detecting a segment of inactive instructions for a given functional unit and, subsequently, replacing the first of the inactive instructions by a SLEEP or REST instruction, depending on the duration of the inactive period, and replacing the last of the inactive instructions with a WAKE instruction.

It is a disadvantage of the prior art processor that the dedicated instructions are only used to switch off and on parts of the processor.

Inter alia, it is an object of the present invention to provide a processor of the kind described in the opening paragraph that is capable of being configured in a more versatile way by dedicated instructions.

It is a further object of the present invention to provide an instruction set of the kind described in the opening paragraph facilitating the more versatile configuration strategy.

It is yet a further object of the present invention to provide a distribution method of the kind described in the opening paragraph enabling the more versatile reconfiguration of processors employing instruction level parallelism.

It is another object of the present invention to provide a compilation method of the kind described in the opening paragraph for creating a software code module facilitating the more versatile configuration strategy.

The invention is defined by the independent claims. The dependent claims define advantageous embodiments.

Now, the first object is realized in that the distribution means are arranged to distribute the plurality of instructions to the plurality of execution units in dependence upon the dedicated instruction.

The dedicated instruction indicates the beginning of an idle period of a given execution unit. By making the distribution means responsive to the dedicated instruction, an instruction flow can be rerouted to the remaining active execution units upon evaluation of the dedicated instruction by the distribution means. Consequently, a string of do nothing, i.e. no-operation (NOP), instructions for a given execution unit can be omitted from the associated instruction bundles, i.e. threads or instruction words, and replaced by a single dedicated instruction, because the distribution means can reroute instructions to the appropriate active execution units. This is especially advantageous in terms of reduced intensity of data communication, because the instruction bundles to be fetched from the instruction memory comprise a largely reduced number of idle instructions, and a smaller number of fetches from memory are required to execute a program associated with the instructions. This results in less power consumption as well as improved processor performance, because the number of time consuming instruction memory accesses is reduced.

It is an advantage if the processor further comprises a plurality of registers for storing the plurality of instructions, the plurality of registers being coupled to the distribution means.

The presence of such registers allows for instruction buffering. Consequently, a greater flexibility in data transfer is achieved, which contributes to an increase in processor performance.

In a preferred embodiment, the distribution means comprise a plurality of dispatch nodes for distributing the plurality of instructions to the plurality of execution units, each dispatch node from the plurality of dispatch nodes being arranged to fetch and evaluate an instruction from a target register from the plurality of registers; control means responsive to the plurality of dispatch nodes; and coupling means responsive to the control means for coupling the plurality of register files to the plurality of dispatch nodes.

The introduction of configurable coupling means facilitates the access of all registers coupled to the coupling means by any of the dispatch nodes. The control means register the detection of a dedicated instruction by a dispatch node, and can adjust the instruction flow from registers to dispatch nodes accordingly. Consequently, instructions stored in a single register can be distributed to a plurality of execution units, which also implies that an instruction bundle fetched from instruction memory does not have to match the corresponding instruction execution resources. In fact, a single bundle can comprise instructions to be executed by a single execution unit in different clock cycles.

It is an advantage of the preferred embodiment if a dispatch node from the plurality of dispatch nodes is at least partially deactivated upon evaluation of the dedicated instruction.

The dedicated instruction can function as a deactivation trigger for the associated dispatch node. Since the dedicated instruction signals an idle period for the execution unit associated with the dispatch node, the dispatch node itself enters an idle period as well. Therefore, the node can at least be partially be switched off, which is advantageous in terms of power consumption. For instance, the only activity left in the dispatch unit is the monitoring of the number of clock cycles that the dispatch unit is inactive, in order to reactivate itself at the appropriate moment.

It is another advantage of the preferred embodiment if the dispatch node is arranged to deactivate an execution unit from the plurality of execution units upon evaluation of the dedicated instruction.

Since the dedicated instruction indicates an inactive period for a given execution unit, this execution unit can be switched off by the dispatch unit. This results in a further reduction of power consumption by the processor.

It is yet another advantage of the preferred embodiment if the dispatch node is reactivated upon receipt of a reactivation signal from the control means.

Instead of monitoring its own number of inactive clock cycles to determine the appropriate reactivation moment, a dispatch node can also be reactivated by the control means. In this way, the dispatch units can be completely switched off, since they do not have to track their own reactivation.

It is yet another advantage of the preferred embodiment if the control means are arranged to generate the reactivation signal responsive to a signal from an execution unit from the plurality of execution units.

This is particularly advantageous in cases where the dispatch node is switched off as the result of a conditional expression like a branch instruction; upon receipt of a signal from the execution unit indicating the condition being met, the control unit can reactivate the appropriate dispatch unit. This, for instance, facilitates loop executions with the use of compact instruction bundles incorporating very little redundant instructions.

It is a further advantage of the preferred embodiment if the control means comprise a plurality of conductors, a conductor from the plurality of conductors coupling a dispatch node from the plurality of dispatch nodes to an evaluator; and a control unit, being responsive to the evaluator, for providing an active dispatch node from the plurality of dispatch nodes with target register selecting information.

When a dispatch unit detects a dedicated instruction, it provides the evaluator with a detection signal. The number of detection signals collected by the evaluator is provided to the control unit, which can construct an offset from this data; this offset is used to connect active dispatch units to the appropriate registers.

Advantageously, the coupling means of the preferred embodiment comprise a data communication bus.

The use of a data communication bus provides fast communication between the registers and the dispatch units, which contributes to a high throughput performance of the arrangement.

Alternatively, the coupling means of the preferred embodiment a plurality of demultiplexers coupled to the plurality of registers; and a plurality of multiplexers coupled to the plurality of dispatch nodes, with each demultiplexer from the plurality of demultiplexers being coupled to each multiplexer from the plurality of multiplexers.

The connection of the registers to the dispatch units via a set of multiplexers and demultiplexers has the advantage that the control of the coupling means by the control means is relatively simple, which means it can be implemented at relatively low cost and area overhead.

The further object of the present invention is realized in that the instruction set further comprises a dedicated instruction for controlling the distribution of the plurality of instructions to the plurality of execution units by the distribution means.

Such instruction sets can be used in conjunction with the processor according to the present invention, thus enabling the rerouting of instructions and the use of more compact instruction bundles.

The yet further object of the invention is realized in that the dispatch method comprises the step of selecting the execution unit from the plurality of execution units upon detection of the dedicated instruction.

Such a method allows for dynamic rerouting of instructions, which obviates the need to use do nothing instructions for the mere sake of redimensioning an instruction bundle to its fixed size in cases where only a subset of the plurality of execution units are scheduled to execute useful instructions.

The another object of the present invention is realized by the step of replacing the first do nothing instruction with a dedicated instruction for controlling the distribution of the plurality of instructions to the plurality of execution units by the distribution means.

The presence of a dedicated instruction in a software code module enables the instruction rescheduling by the distribution means in the processor according to the present invention.

It is an advantage if the compilation method comprises the further step of removing the remaining do nothing instructions from the plurality of do nothing instructions from the plurality of instruction bundles.

The removal of do nothing instructions from the instruction bundles yields a software code module with an increased density of useful, e.g. other than do nothing, instructions per instruction bundle. This is particularly advantageous in terms of total code size.

It is another advantage if the compilation method comprises the further step of regrouping the plurality of instruction bundles into a further plurality of instruction bundles. Regrouping the plurality of instruction bundles into a further plurality of instruction bundles, preferably into bundles with a fixed size, reduces the complexity of the instruction ordering in the software code module. Consequently, the reformed instruction bundles may contain multiple instructions to be executed by a single execution unit, which can be dispatched to that unit in the appropriate order upon evaluation of the dedicated instruction. This implies that less memory accesses are required for the execution of such a code module, which contributes to a reduction in power consumption of the processor involved.

It is yet another advantage if the compilation method comprises the step of adding information to the dedicated instruction indicating the number of removed do nothing instructions.

This enables the distribution means of the processor of the present invention to extract information indicating the inactive period of the corresponding execution unit of the processor from the dedicated instruction, which can be used to deactivate parts of the processor for that amount of time.

It is another advantage if the compilation method comprises the step of adding information to the dedicated instruction indicating a cause of the presence of the plurality of do nothing instructions.

This is particularly useful when the inactive period of an execution unit of a processor is caused by a conditional event, e.g. the occurrence of a branch instruction marking the end of a loop instruction. The information can be used to alert the distribution means that an interrupt signal indicating that the condition has been met will occur at some point in time, which can be used by the distribution means to reactivate temporarily deactivated parts of the processor.

The invention is described in more detail and by way of non-limiting examples with reference to the accompanying drawings, wherein.

Figure 1:
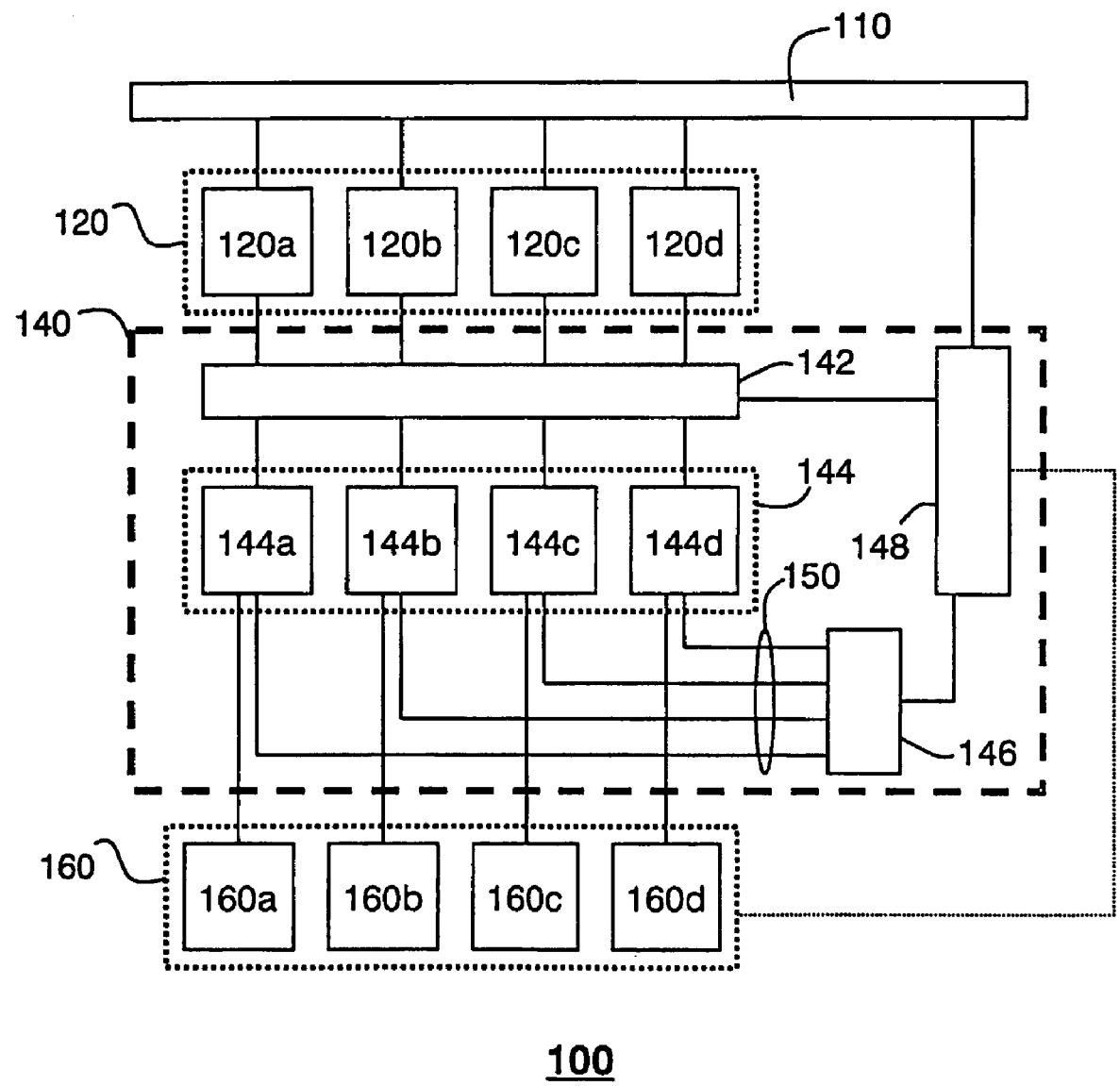
FIG. 1 shows an embodiment of a part of a processor according to the present invention.

In FIG. 1, a part of a processor 100 has a plurality of registers 120, coupled to distribution unit 140. The outputs of distribution unit 140 are coupled to a plurality of execution units 160. In a preferred embodiment, distribution unit 140 has a data communication bus 142, which couples the plurality of registers 120 to a plurality of dispatch units 144. Dispatch units 144a, 144b, 144c, 144d are arranged to detect a dedicated instruction in the instruction flow marking the beginning of an idle period of the execution unit 160a, 160b, 160c, 160d to which the dispatch unit 144a, 144b, 144c, 144d is coupled. In FIG. 1, each dispatch unit 144a, 144b, 144c, 144d is coupled to an execution unit 160a, 160b, 160c, 160d.

It is emphasized though that not every execution unit of processor 100 has to be connected to a register via the distribution unit 140; it will be understood by those skilled in the art that mixed configurations, in which only a subset of the execution units is connected to a register via distribution unit 140 are also possible without departing from the teachings of the present invention. Such mixed configurations can be useful in cases where some execution units are arranged to perform dedicated tasks, making them relatively insensitive to instruction scheduling problems. In addition, it is stipulated that the number of four registers, dispatch units and execution units is chosen by way of example only; other numbers of these elements can be present without departing from the teachings of the present invention.

Data communication bus 142 is controlled by control unit 148. In the here presented embodiment, control unit 148 is coupled to the plurality of dispatch units 144 via evaluator 146 and the plurality of conductors 150. Each conductor from the plurality of conductors 150 is coupled to a dispatch unit 144a, 144b, 144c, 144d from the plurality of dispatch units 144. Evaluator 146 is arranged to receive a signal from a dispatch unit 144a, 144b, 144c, 144d when a dedicated instruction is detected. Evaluator 146 collects the signals provided through the plurality of conductors 150 and provides control unit 148 with the necessary information to control the coupling of the appropriate register 120a, 120b, 120c, 120d to an active dispatch unit 144a, 144b, 144c, 144d. Control unit 148 can provide a dispatch unit 144a, 144b, 144c, 144d with register address selecting information, but other data access control mechanisms known in the art can be used as well. At this point, it is stated that will be obvious to those skilled in the art that the presence of a separate evaluator 146 is not strictly necessary. Evaluator 146 can be integrated in control unit 148, and, in addition, control unit 148 can be distributed over at least one of the dispatch units 144a, 144b, 144c, 144d without departing from the scope of the invention.

Consequently, distribution unit 140 is arranged to distribute the plurality of instructions to the plurality of execution units (160) in dependence upon the dedicated instruction, because the detection of a dedicated instruction will lead to the rerouting of a register 120a, 120b, 120c, 120d to another execution unit 160a, 160b, 160c, 160d.

Control unit 148 and the plurality of registers 120 are connected to a further data communication bus 110. Further data bus 110 is used to access an instruction memory not shown; control unit 148 controls the fetching of instruction bundles from the instruction memory, which are subsequently stored in the plurality of registers 120. The use of further data bus 110 by both control unit 148 and the plurality of registers 120 should not be explained as limiting; other arrangement, in which control unit 148 and the plurality of registers 120 use different communication means can readily be used without departing from the scope of the invention.

Preferably, dispatch units 144a, 144b, 144c, 144d are arranged to be at least partially switched off upon receipt and evaluation of a dedicated instruction in order to achieve a power reduction. If the dedicated instruction comprises information regarding the number of clock cycles, dispatch units 144a, 144b, 144c, 144d can be extended with a simple comparator circuit not shown for controlling their own reactivation by monitoring the clock cycles. Alternatively, control unit 148 can be extended with such a comparator, in which case control unit 148 has to be presented with the aforementioned information in order to be able to control the reactivation of deactivated dispatch units 144a, 144b, 144c, 144d. This information can be provided to control unit 148 via the plurality of conductors 150. The reactivation can be achieved by providing a dispatch unit 144a, 144b, 144c, 144d with a reactivation signal, for instance via data communication bus 142.

Since a dedicated instruction indicates the start of an idle period for a execution unit 160a, 160b, 160c, 160d to which the receiving dispatch unit 144a, 144b, 144c, 144d is coupled, it is also preferable in terms of a further power reduction that the dispatch unit 144a, 144b, 144c, 144d is arranged to switch off the associated execution unit 160a, 160b, 160c, 160d. This can for instance be done by providing the associated execution unit 160a, 160b, 160c, 160d with a clock gating signal or, in asynchronous architectures, by withholding an enable signal; as long as dispatch unit 144a, 144b, 144c, 144d are at least partially switched off, the clock of associated execution unit 160a, 160b, 160c, 160d is gated, or the associated execution unit 160a, 160b, 160c, 160d is dormant because of the absence of a handshake request signal, effectively stalling the execution unit 160a, 160b, 160c, 160d. As soon as the dispatch unit 144a, 144b, 144c, 144d is reactivated again, the stall of associated execution unit 160a, 160b, 160c, 160d is lifted and associated execution unit 160a, 160b, 160c, 160d becomes active again.

Optionally, control unit 148 can be made responsive to the plurality of execution units 160. This facilitates the rerouting of instructions upon detection of an undefined idle period of an execution unit 160a, 160b, 160c, 160d, e.g. an idle period depending on the evaluation of a conditional expression. This is particularly advantageous during loop executions, where conditional expressions are used to mark the end of a loop. As soon as the condition is met, an execution unit 160a, 160b, 160c, 160d signals the control unit 148, triggering control unit 148 to restore the original routing between the plurality of registers 120 and the plurality of dispatch units 144. Typically, the content of the plurality of registers 120 will be flushed as well, as usually is the case when a branch instruction is taken. The flush can either be controlled by control unit 148 through a connection not shown with the plurality of registers 120 or by other hardware responsive to the plurality of execution units 160.

At this point, it is emphasized that the present invention can be applied to a wide range of processor architectures; e.g. VLIW or multithreading processors as well as synchronous or asynchronous architectures can incorporate the present invention, and it will be obvious to those skilled in the art that further architectures can be easily thought of.

Now, the following Figs. are described with reference to the detailed description of FIG. 1. Reference numerals introduced in FIG. 1 will have similar meaning in the following Figs., unless explicitly stated otherwise.

Figure 2:
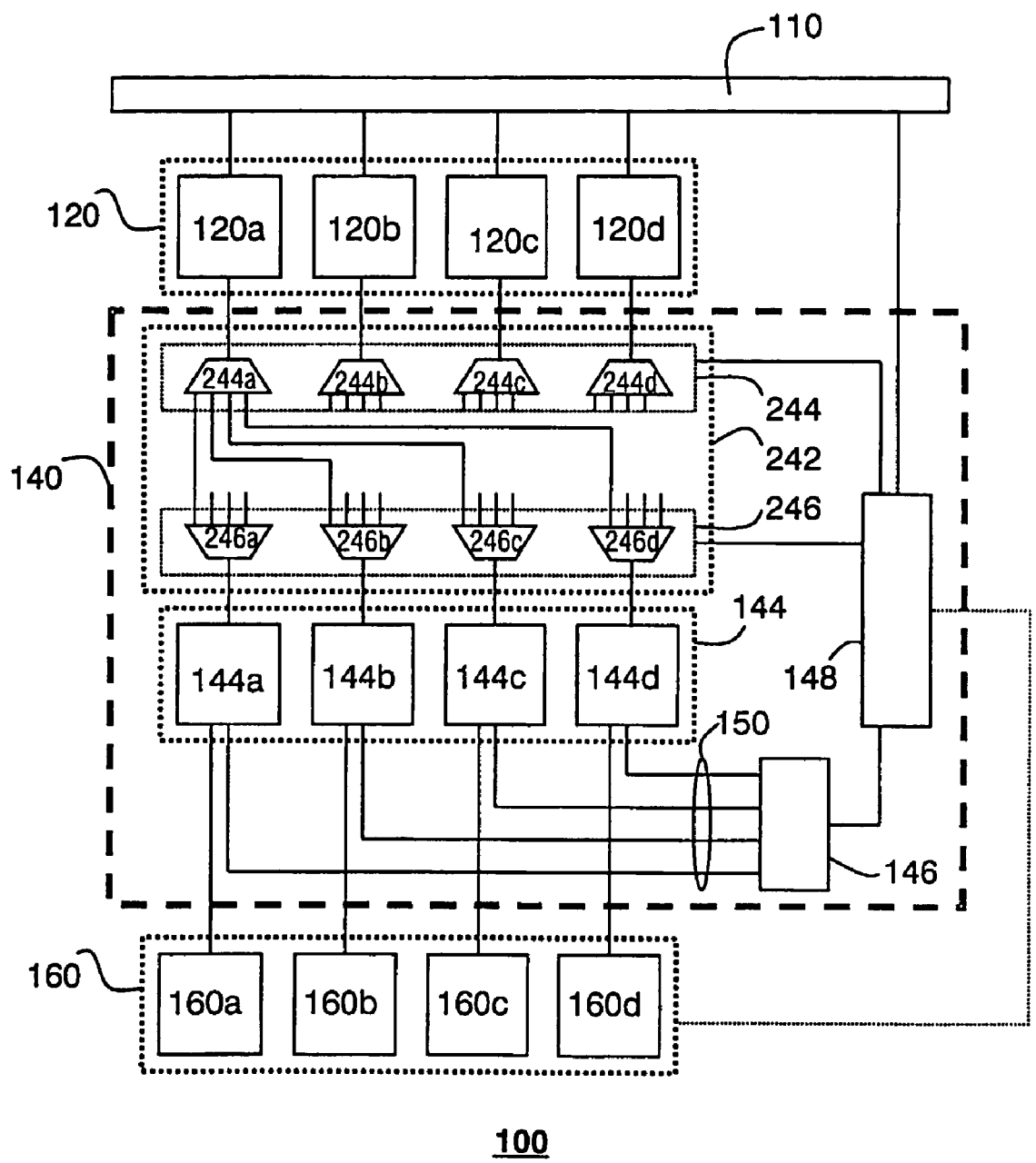
FIG. 2 shows another embodiment of a part of a processor according to the present invention.

In FIG. 2, another preferred embodiment of processor 100 is shown. With respect to the processor 100 depicted in FIG. 1, data communication bus 142 has been replaced by a data communication network 242. Data communication network 242 has a plurality of demultiplexers 244, with each demultiplexer 244a, 244b, 244c, 244d being coupled to a register 120a, 120b, 120c, 120d and being controlled by control unit 148. Data communication network 242 further has a plurality of multiplexers 246, with each multiplexer 246a, 246b, 246c, 246d being coupled to a register 120a, 120b, 120c, 120d and being controlled by control unit 148. Each demultiplexer 244a, 244b, 244c, 244d is coupled to all multiplexers from the plurality of multiplexers 246, thus providing complete connectivity between the plurality of register files 120 and the plurality of dispatch nodes 144. It is stipulated that in FIG. 2 only the connections from demultiplexer 244a to all multiplexers from the plurality of multiplexers 246 are explicitly shown. This is done because of reasons of clarity only, and does not suggest that the connections of demultiplexers 244b, 244c, 244d to all multiplexers from the plurality of multiplexers 246 are missing. The main difference with the embodiment shown in FIG. 1 is that control means 148 does not have to provide each individual dispatch unit 144a, 144b, 144c, 144d with register access information.

Control unit 148 fully controls the routing between the plurality of registers 120 and the plurality of dispatch units 144 by providing each demultiplexer 244a, 244b, 244c, 244d and each multiplexer 246a, 246b, 246c, 246d with an appropriate control signal. It is emphasized that, preferably, control unit 148 also controls the fetching of new instruction bundles to be stored in the plurality of registers 120 from instruction memory. Consequently, the routing signals provided to the plurality of demultiplexers 244 can also be used as access enable signals for the accompanying plurality of registers 120. In other words, a register 120a, 120b, 120c, 120d is only accessed when a demultiplexer 244a, 244b, 244c, 244d receives a routing signal from control unit 148.

It is emphasized that, although both present in FIG. 2, either the plurality of demultiplexers 244 or the plurality of multiplexers 246 can be omitted from the data communication network 242. This is not preferred though, because it places a large burden on the capacitive loads of the remaining interconnections, which can easily lead to a deterioration of throughput performance. Furthermore, it will be obvious to those skilled in the art that other known realizations of data communication network 242 can be used without departing from the teachings of the present invention.

Figure 3:
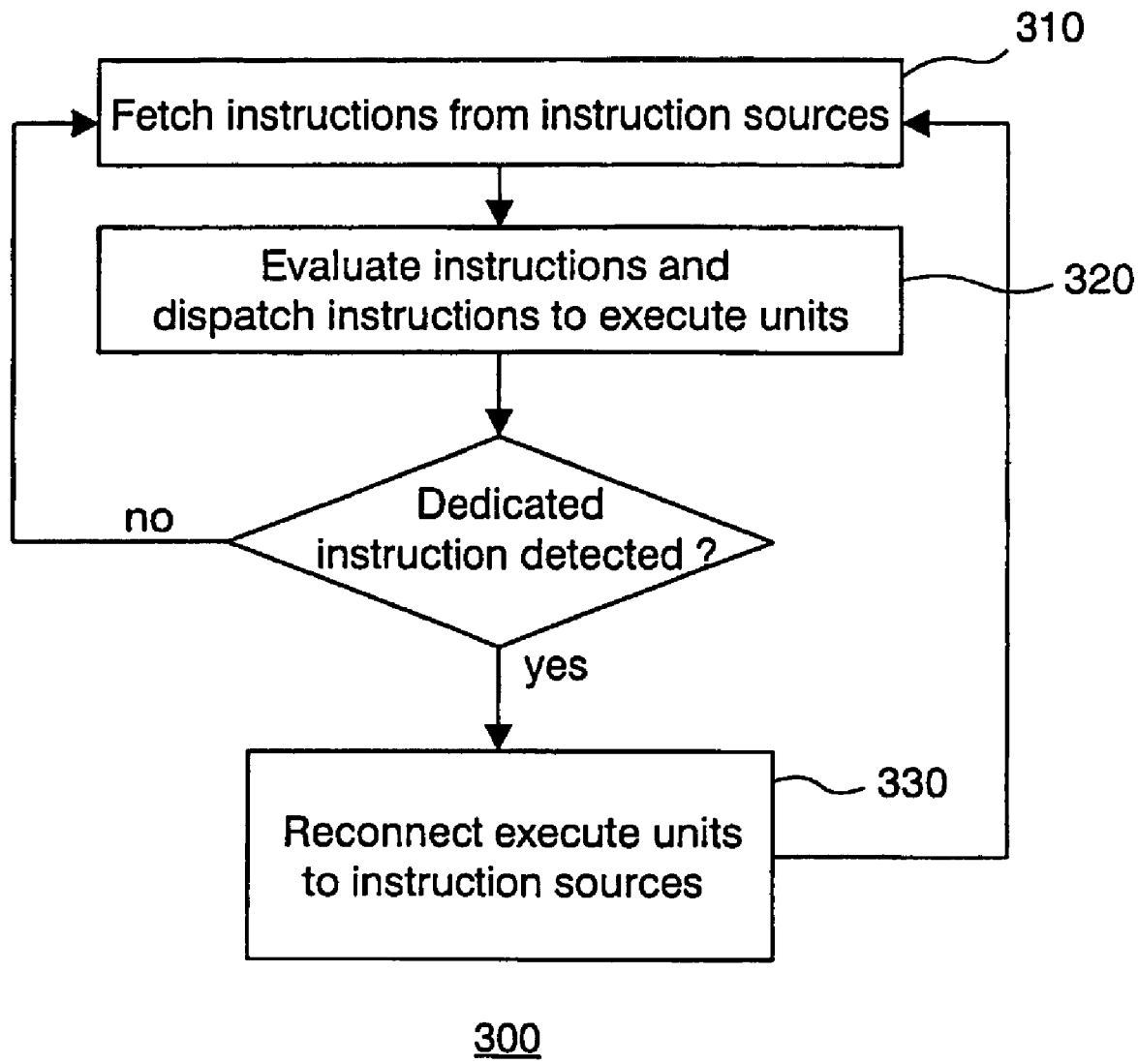
FIG. 3 shows a flowchart of a distribution method according to the present invention.

In FIG. 3, a flowchart of the method 300 describing the modus operandi regarding the distribution and rerouting of instructions in processors like processor 100 is shown. A first step 310 comprises fetching a first plurality of instructions like an instruction bundle from instruction sources like the plurality of registers 120.

Next step 320 deals with detecting the dedicated instruction by evaluating the instructions from the plurality of instructions prior to dispatching them to the plurality of execution units 160. The detection of such an instruction signals an inactive period of a corresponding execution unit 160a, 160b, 160c, 160d, which means that at least some of the instructions of the next fetched plurality of instructions have to be rerouted.

Consequently, in step 330 distribution means 140 are reconfigured, resulting in the reconnecting of the execution units 160a, 160b, 160c, 160d to the plurality of registers 120 resulting in the fact that the instructions for at least some of the execution units 160a, 160b, 160c, 160d now originate from a different storage location. It will be understood by those skilled in the art that step 330 may have to be repeated for every next fetched plurality of instructions. This will be explained in more detail in the detailed description of FIG. 5.

Figure 4:
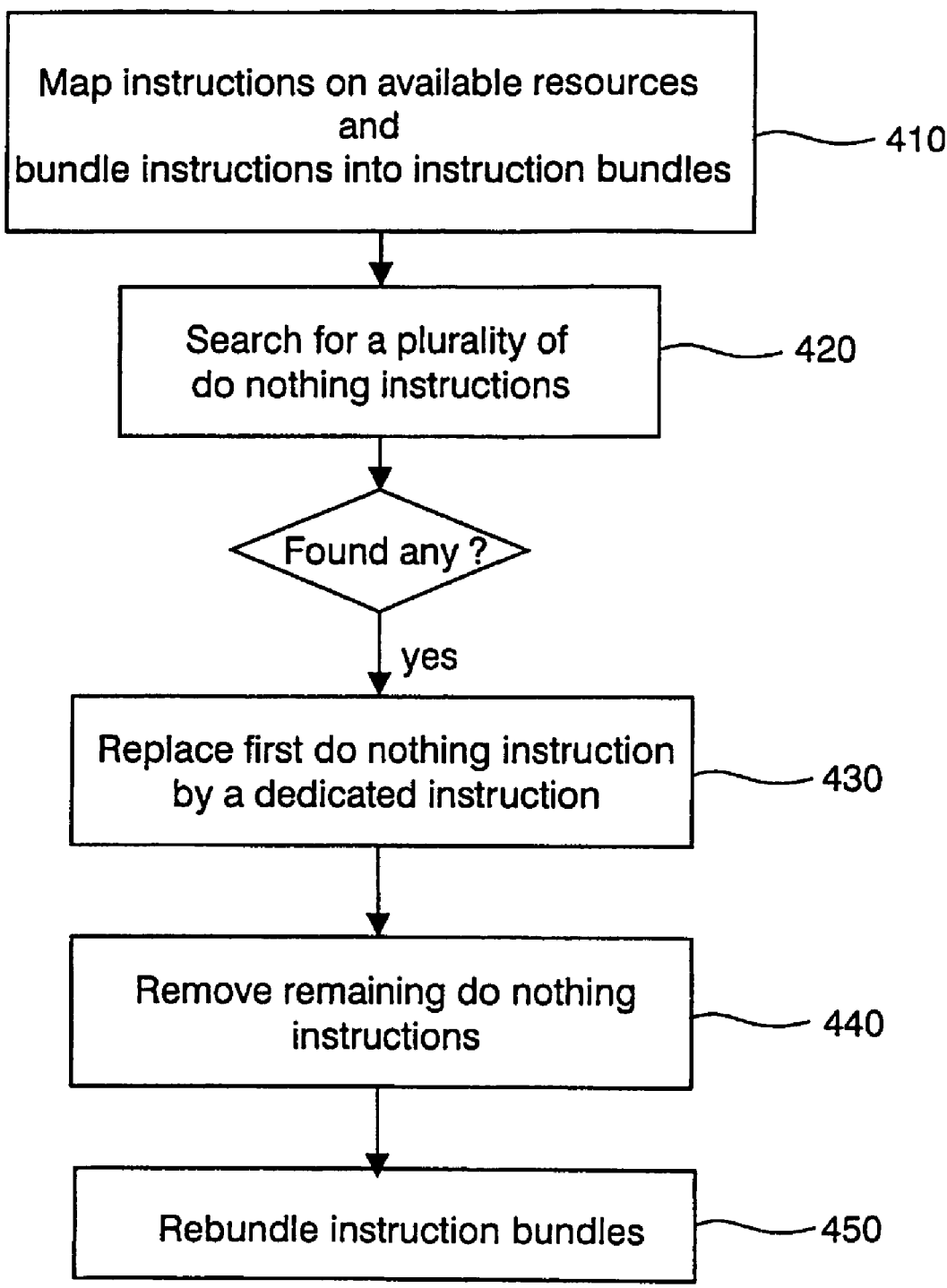
FIG. 4 shows a flowchart of a compilation method according to the present invention.

In FIG. 4, a compilation method 400 for forming the compressed instruction bundles is disclosed. In a first step 410, mapping an instruction to an execution unit 160a, 160b, 160c, 160d from the plurality of execution units 160 and bundling the instructions into an instruction bundle takes place. This step is usually repeated until compilation of the software code module is at least partially complete. Subsequently, step 420 deals with searching the instruction bundles for a plurality of do nothing instructions for contiguous execution by an execution unit. Such a plurality of do nothing instructions indicate a prolonged period of inactivity for a given execution unit, which provides an opportunity for the generation of a more compact software code module.

Therefore, if such a plurality is detected, in step 430 the plurality of instruction bundles is modified by replacing a first do nothing instruction from the plurality of do nothing instructions with a dedicated instruction signaling the start of an inactive period of the associated execution unit.

Optionally, step 430 can be extended with a substep in which information is added to the dedicated instruction indicating the number of removed do nothing instructions from the instruction bundles, i.e. the number of cycles the execution unit is scheduled to be inactive, or by adding information to the dedicated instruction about the event leading to the occurrence of the inactive period of the execution unit 160a, 160b, 160c, 160d; e.g. an branch instruction or another conditional instruction.

In next step 440 the remaining do nothing instructions from the plurality of do nothing instructions are removed from the plurality of instruction bundles, followed by step 450 of regrouping the plurality of instruction bundles into a further plurality of instruction bundles, each instruction bundle from the further plurality of instruction bundles having the fixed size. Although steps 420 to 440 may be repeated until all pluralities of do nothing instructions associated with a prolonged inactive period of an execution unit 160a, 160b, 160c, 160d are indeed removed from the software code module, this preferably is done in a single cycle by repeating steps 420, 430 before steps 440 and 450 are performed (vide infra). It will have become apparent to those skilled in the art that at least some of the instruction bundles formed in step 450 can comprise a plurality of instructions for a single execution unit.

Figure 5:
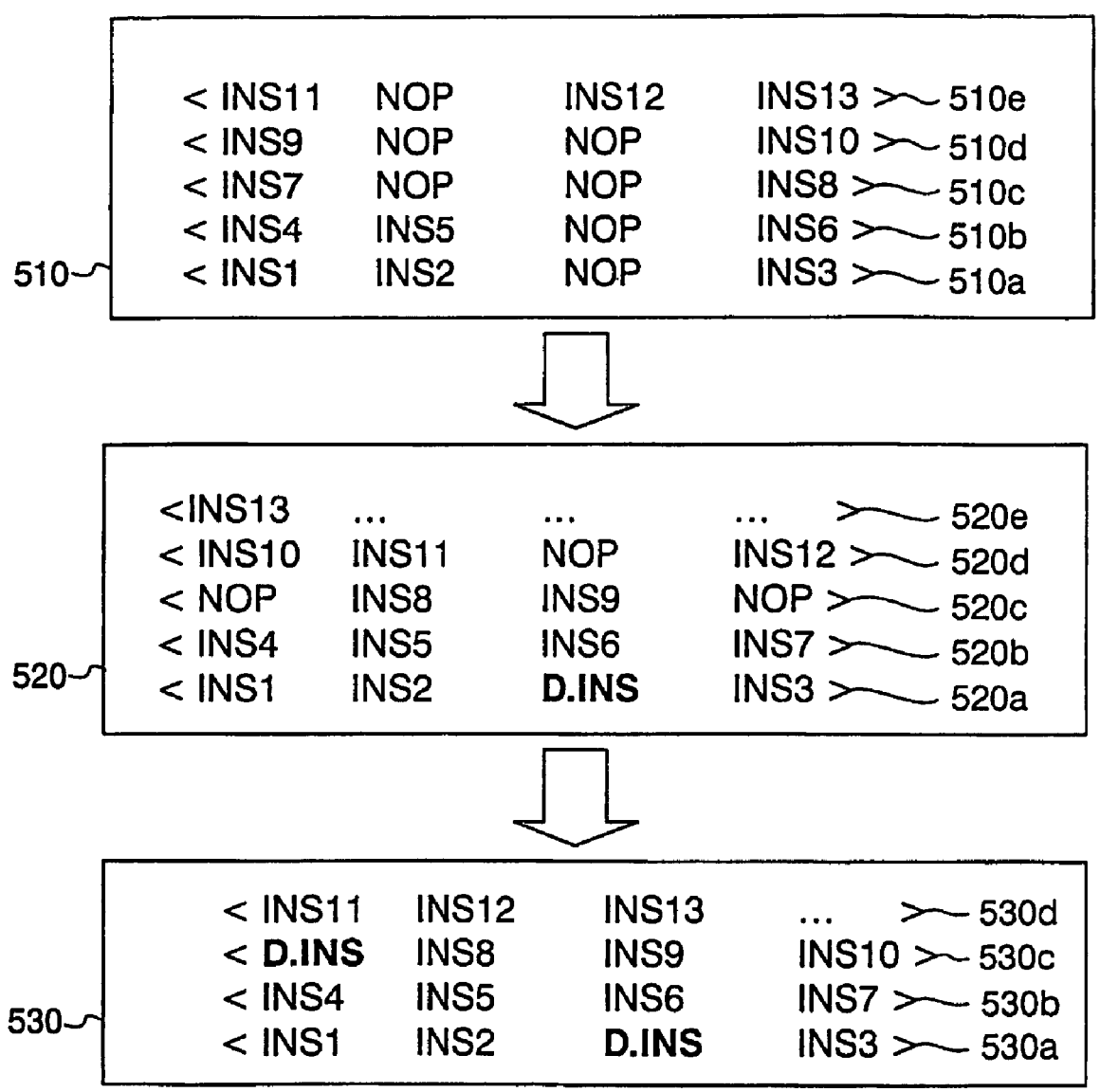
FIG. 5 depicts an example of a plurality of instruction bundles generated with the compilation method according to the present invention.

This is visualized in FIG. 5, where an exemplary execution of the compilation method 400 described in FIG. 4 is given. Therefore, FIG. 5 refers back to the detailed description of FIG. 4. Software code module 510 contains five instruction bundles 510*a-e* for execution on processor 100. Software code module 510 is generated in step 410 of compilation method 400, and contains four columns of instructions; the leftmost column being arranged for execution on execution unit 160*a*, the second column being arranged for execution on execution unit 160*b*, the third column being arranged for execution on execution unit 160*c* and the rightmost column being arranged for execution on execution unit 160*d*. Two types of instructions are present in software code module 510: useful instructions, which are labeled INSx, with x being a positive integer and do nothing instructions, labeled NOP.

Software code module 510 contains pluralities of do nothing instructions for contiguous execution by an execution unit 160*a*, 160*b*, 160, 160*d*: a first one beginning with a NOP instruction for execution unit 160*c* in instruction bundle 510*a* and a second one beginning with a NOP instruction for execution unit 160*b* in instruction bundle 510*c*. Now, execution of steps 420-450 of the compilation method 400 leads to intermediate software code module 520 consisting of modified instruction bundles 520*a*-520*e*. The first plurality of do nothing instructions for execution unit 160*c* has been removed and replaced by a single dedicated instruction D.INS in instruction bundle 520*a*. Consequently, the density of useful instructions in software code module 520 has become higher than that of software code module 510 although the columns of instructions no longer match their intended destination in processor 100 and have to be rescheduled by distribution unit 140 based on the inserted dedicated instruction D.INS. In a next step, steps 420-440 are repeated to remove the second plurality of do nothing instructions. This is now more difficult, because the NOP instructions are no longer located in a single column. Therefore, it is preferred that before code compaction, i.e. steps 440 and 450 are performed, steps 420 and 430 are repeated until all targeted pluralities of do nothing instructions have been found.

The removal of the second plurality of do nothing instruction and subsequent code compaction yields software code module 530, consisting of instruction bundles 530*a-d*. Note that instruction bundle 530*d* also has the appropriate size; the three dots in the rightmost column merely indicate that the there located instruction can either be a do nothing instruction, a useful instruction or a dedicated instruction. It will be obvious to those skilled in the art that instruction bundles 530*a-d* each contain a plurality of instructions for a single execution unit 160*a*, 160*b*, 160*c*, 160*d*. Therefore, the reconfiguration of coupling means 142, 242 usually has to be performed several times to enable the correct distribution of all instructions in a single instruction bundle. In other words, the detection of a single dedicated instruction typically leads to a number of reconfigurations by distribution means 140.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A parallel processor for executing code for that has been compiled to achieve code compaction, the code comprising a plurality of successive instruction bundles each comprising a plurality of instructions, one instruction for each of a corresponding plurality of execution units, the instructions including a do nothing instruction pertaining to a first duration in which a single instruction is executed and in response to which an execution unit performs no operation, the parallel processor comprising:

a memory;

an instruction dispatch stage comprising a plurality of dispatch units, the instruction dispatch stage being configured to detect in a first instruction bundle a dedicated instruction for a particular execution unit;

circuitry for flexibly routing different instructions of an instruction bundle from the memory to different ones of the dispatch units;

an instruction execution stage comprising a plurality of execution units, coupled to and following the instruction dispatch stage;

the instruction dispatch stage being configured to, in response to the dedicated instruction:

reduce power to or turn off the particular execution unit for a variable duration in which multiple instructions would otherwise have been executed by the particular execution unit; and cause the circuitry to reroute instructions in a next successive instruction bundle following the first instruction bundle such that an instruction that logically corresponds to the particular execution unit is rerouted to a different execution unit.

2. A parallel processor as claimed in claim 1, wherein the memory comprises a plurality of registers for storing instructions, the plurality of registers being coupled to said circuitry.

3. A parallel processor as claimed in claim 1, wherein a dispatch unit is configured to at least partially deactivate itself in response to the dedicated instruction.

4. A parallel processor as claimed in claim 3, comprising a control circuit for reactivating a dispatch unit after said variable duration.

5. A parallel processor as claimed in claim 4, wherein the control circuit is configured to generate the reactivation signal responsive to a signal from an execution unit.

6. A parallel processor as claimed in claim 1, wherein said circuitry comprises a data communication bus.

7. A parallel processor as claimed in claim 1, wherein said circuitry comprises:

a plurality of demultiplexers coupled to the plurality of registers; and a plurality of multiplexers coupled to the plurality of dispatch nodes units, with each demultiplexer of the plurality of demultiplexers being coupled to each multiplexer of from the plurality of multiplexers.

8. A method of executing code for a parallel processor that has been compiled to achieve code compaction, the code comprising a plurality of successive instruction bundles each comprising a plurality of instructions, one instruction for each of a corresponding plurality of execution units, the instructions including a do nothing instruction pertaining to a duration in which a single instruction is executed and in response to which an execution unit performs no operation, the method comprising:

at an instruction dispatch stage preceding an instruction execution stage, detecting in a first instruction bundle a dedicated instruction for a particular execution unit;

in response to the dedicated instruction:

reducing power to or turning off the particular execution unit for a duration in which multiple instructions would otherwise have been executed by the particular execution unit; and rerouting instructions in a next successive instruction bundle following the first instruction bundle such that an instruction that logically corresponds to the particular execution unit is rerouted to a different execution unit.

9. A method of compiling code for a parallel processor to achieve code compaction, the code comprising a plurality of first successive instruction bundles each comprising a plurality of instructions, one instruction for each of a corresponding plurality of execution units, the instructions including a do nothing instruction pertaining to a duration in which a single instruction is executed and in response to which an execution unit performs no operation, the method comprising:

detecting within the plurality of first bundles of instructions a plurality of do nothing instructions that are successive instructions for a particular execution unit;

replacing a first one of the plurality of do nothing instructions with a dedicated instruction for the particular execution unit;

removing at least one other one of the plurality of do nothing instructions such that the code contains fewer total instructions; and re-bundling the code to form a plurality of second different instructions bundles.

10. A method as claimed in claim 9, wherein removing comprises removing all remaining do nothing instructions from the plurality of do nothing instructions from the plurality of first bundles of instruction.

11. A method as claimed in claim 10, further comprising including information within the dedicated instruction indicating a number of removed do nothing instructions.

\* \* \* \* \*